(12) United States Patent
Li et al.

(10) Patent No.: US 8,160,774 B2
(45) Date of Patent: Apr. 17, 2012

(54) VEHICULAR ACTUATOR SYSTEM

(75) Inventors: Yunjun Li, West Bloomfield, MI (US); Chandra S. Namuduri, Troy, MI (US); Nancy McMahon, Rochester Hills, MI (US); Robert B. Elliott, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 710 days.

(21) Appl. No.: 12/252,114

(22) Filed: Oct. 15, 2008

(65) Prior Publication Data

US 2010/0094503 A1    Apr. 15, 2010

(51) Int. Cl.
*B60G 17/018* (2006.01)

(52) U.S. Cl. ....... 701/37; 188/266; 188/267; 188/267.1; 188/267.2

(58) Field of Classification Search .................... 701/37; 188/266, 267, 267.1, 267.2
See application file for complete search history.

(56) References Cited

U.S. PATENT DOCUMENTS

| | | | |
|---|---|---|---|
| 2,594,755 | A | 4/1952 | Felt |
| 4,297,609 | A | 10/1981 | Hirao et al. |
| 4,458,234 | A | 7/1984 | Brisard |
| 4,600,215 | A | 7/1986 | Kuroki et al. |
| 4,757,315 | A | 7/1988 | Lichtenberg et al. |
| 4,817,922 | A | 4/1989 | Hovance |
| 4,822,063 | A | 4/1989 | Yopp et al. |
| 4,827,416 | A | 5/1989 | Kawagoe et al. |
| 4,836,578 | A | 6/1989 | Soltis |
| 5,009,450 | A | 4/1991 | Herberg et al. |
| 5,056,913 | A | 10/1991 | Tanaka et al. |
| 5,103,396 | A | 4/1992 | Hiwatashi et al. |
| 5,127,667 | A | 7/1992 | Okuda et al. |
| 5,218,308 | A | 6/1993 | Bosebeck et al. |
| 5,251,729 | A | 10/1993 | Nehl et al. |
| 5,267,466 | A | 12/1993 | Morris |
| 5,347,186 | A | 9/1994 | Konotchick |
| 5,373,445 | A | 12/1994 | Yopp |
| 5,390,949 | A | 2/1995 | Naganathan et al. |
| 5,450,322 | A | 9/1995 | Tanaka et al. |
| 5,461,564 | A | 10/1995 | Collins et al. |
| 5,638,927 | A | 6/1997 | Cheatham et al. |

(Continued)

FOREIGN PATENT DOCUMENTS

DE      39 09 190 C1    8/1990

(Continued)

OTHER PUBLICATIONS

Namuduri, Chandra S. et al. "Notice of Allowance" mailed Jan. 4, 2011; US Appl. No. 12/394,438, filed Feb. 27, 2009.

(Continued)

*Primary Examiner* — Toan To
(74) *Attorney, Agent, or Firm* — Ingrassia Fisher & Lorenz, P.C.

(57) ABSTRACT

An actuator system for determining a relative height differential between a housing of an actuator assembly and a body of the actuator assembly for a vehicle is provided. The vehicle has a suspension wherein the housing is coupled to a first portion of the suspension, and the body is coupled to a second portion of the suspension. The system comprises a sensor coupled to the inside of the housing, and a target coupled to the outside of the body, the sensor and the target cooperating to form a magnetic field that varies in a manner indicative of the distance therebetween.

18 Claims, 5 Drawing Sheets

U.S. PATENT DOCUMENTS

| | | | |
|---|---|---|---|
| 5,944,763 A | 8/1999 | Iwasaki | |
| 5,990,441 A | 11/1999 | Zaenglein et al. | |
| 6,069,581 A | 5/2000 | Bell et al. | |
| 6,111,375 A | 8/2000 | Zenobi | |
| 6,209,691 B1 | 4/2001 | Fehring et al. | |
| 6,234,654 B1 | 5/2001 | Okuchi et al. | |
| 6,328,144 B1 * | 12/2001 | Hayakawa et al. | 188/299.1 |
| 6,427,812 B2 | 8/2002 | Crawley et al. | |
| 6,502,837 B1 | 1/2003 | Hamilton et al. | |
| 6,614,239 B2 | 9/2003 | Borghi | |
| 6,694,856 B1 * | 2/2004 | Chen et al. | 89/43.01 |
| 6,771,007 B2 | 8/2004 | Tanielian | |
| 6,866,127 B2 | 3/2005 | Nehl et al. | |
| 6,938,311 B2 | 9/2005 | Tanielian | |
| 7,057,330 B2 | 6/2006 | Buhler et al. | |
| 7,123,351 B1 | 10/2006 | Schaefer | |
| 7,221,437 B1 | 5/2007 | Schaefer | |
| 7,250,697 B2 | 7/2007 | Beaulieu | |
| 7,261,171 B2 | 8/2007 | De La Torre et al. | |
| 7,380,800 B2 | 6/2008 | Klees | |
| 7,420,462 B2 | 9/2008 | Nordmeyer | |
| 7,521,841 B2 | 4/2009 | Clingman et al. | |
| 7,654,370 B2 * | 2/2010 | Cubalchini, Jr. | 188/267 |
| 7,733,239 B2 | 6/2010 | Nordmeyer | |
| 7,737,608 B2 | 6/2010 | Ruggeri et al. | |
| 7,770,701 B1 * | 8/2010 | Davis | 188/267.1 |
| 7,777,396 B2 | 8/2010 | Rastegar et al. | |
| 7,839,058 B1 | 11/2010 | Churchill et al. | |
| 7,849,983 B2 * | 12/2010 | St. Clair et al. | 188/267.1 |
| 7,948,613 B2 | 5/2011 | Fourcault et al. | |
| 2002/0032508 A1 | 3/2002 | Uchino et al. | |
| 2003/0034697 A1 | 2/2003 | Goldner et al. | |
| 2005/0077692 A1 | 4/2005 | Ogawa | |
| 2005/0090956 A1 | 4/2005 | Ogawa | |
| 2005/0270221 A1 | 12/2005 | Fedotov et al. | |
| 2006/0176158 A1 | 8/2006 | Fleming | |
| 2006/0186586 A1 | 8/2006 | Soles et al. | |
| 2006/0188120 A1 | 8/2006 | Fisher | |
| 2006/0271678 A1 | 11/2006 | Jessup et al. | |
| 2007/0032913 A1 | 2/2007 | Ghoneim et al. | |
| 2007/0129865 A1 | 6/2007 | Kim | |
| 2007/0205881 A1 | 9/2007 | Breed | |
| 2007/0251776 A1 | 11/2007 | Braun | |
| 2008/0116849 A1 | 5/2008 | Johnston | |
| 2008/0252174 A1 | 10/2008 | Mohammadi et al. | |
| 2008/0277939 A1 | 11/2008 | Richardson et al. | |
| 2008/0284258 A1 | 11/2008 | Spratte et al. | |
| 2009/0021720 A1 | 1/2009 | Hecker | |
| 2009/0045698 A1 | 2/2009 | Genis et al. | |
| 2009/0278927 A1 | 11/2009 | Ishiyama et al. | |
| 2010/0045143 A1 | 2/2010 | Martin | |
| 2010/0052475 A1 | 3/2010 | Lee | |
| 2010/0084947 A1 | 4/2010 | Yoon et al. | |
| 2010/0123568 A1 | 5/2010 | Namuduri et al. | |
| 2010/0125389 A1 | 5/2010 | Talty et al. | |
| 2010/0219641 A1 | 9/2010 | Namuduri et al. | |
| 2010/0219720 A1 | 9/2010 | Namuduri et al. | |
| 2010/0219721 A1 | 9/2010 | Namuduri et al. | |
| 2010/0219798 A1 | 9/2010 | Namuduri et al. | |
| 2010/0225527 A1 | 9/2010 | Talty et al. | |
| 2010/0244629 A1 | 9/2010 | Nagashima et al. | |

FOREIGN PATENT DOCUMENTS

| | | |
|---|---|---|
| DE | 41 12 276 C2 | 11/1992 |
| DE | 295 18 322 U1 | 1/1996 |
| DE | 103 58 764 A1 | 7/2005 |
| DE | 10 2004 010 229 A1 | 9/2005 |
| DE | 10 2005 008 403 A1 | 9/2006 |
| FR | 2594755 A3 | 8/1987 |
| GB | 2 098 007 A | 11/1982 |
| JP | 60101425 A | 6/1985 |
| JP | 4359901 B1 | 11/2009 |

OTHER PUBLICATIONS

Notice of Allowance mailed Nov. 18, 2010, issued in U.S. Appl. No. 12/394,438.

Notice of Allowance mailed Oct. 18, 2010, issued in U.S. Appl. No. 12/400,112.

Sang-Dong, K., et al., "Performance Analysis of UWB Radar for Vehicle in Multi-User Environments," 10th International Conference on Advanced Communication Technology, ICACT. Feb. 17-20, 2008, pp. 1036-1039, vol. 2.

Samkov, S.V., "Signal Processing in UWB Radars of Small Distance," 2004 Second International Workshop on Ultrawideband and Ultrashort Impulse Signals. Sep. 19-22, 2004, pp. 208-210.

Li, Y., et al. "Self-Powered Vehicle Sensor Systems," U.S. Appl. No. 12/900,707.

Optek Technology, Inc. "Optek's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

German Office Action for German Application No. 10 2010 008 318.6 mailed May 11, 2011.

German Office Action for German Application No. 10 2009 047 855.8-21 mailed Jan. 21, 2011.

German Office Action for German Application No. 10 2009 052 717.6-21 mailed Feb. 16, 2011.

U.S. Office Action for U.S. Appl. No. 12/271,551 mailed Feb. 10, 2011.

Chinese Office Action for Chinese Application No. 200910206391.1 mailed Jan. 19, 2011.

U.S. Final Office Action dated Jul. 15, 2011 for U.S. Appl. No. 12/271,551.

U.S. Notice of Allowance dated Jul. 18, 2011 for U.S. Appl. No. 12/394,322.

U.S. Office Action dated Jun. 17, 2011 for U.S. Appl. No. 12/394,326.

U.S. Office Action dated Aug. 1, 2011 for U.S. Appl. No. 12/272,074.

U.S. Office Action for U.S. Appl. No. 12/394,328 mailed Jun. 10, 2011.

Notice of Allowance, dated Nov. 16, 2011, for U.S. Appl. No. 12/394,326.

Notice of Allowance, dated Jan. 9, 2012, for U.S. Appl. No. 12/272,074.

Notice of Allowance, dated Jan. 5, 2012, for U.S. Appl. No. 12/271,551.

* cited by examiner

VEHICULAR ACTUATOR SYSTEM

TECHNICAL FIELD

The present invention generally relates to vehicular suspension systems, and more particularly relates to an actuator system for determining relative height differential in a vehicular suspension.

BACKGROUND OF THE INVENTION

Control systems that automatically regulate ride height have been integrated into the suspensions of many vehicles. These systems rely on height or relative displacement sensors to provide real-time feedback on the distance between selected suspension components of sprung and unsprung vehicle masses. Controllers respond to height variations by adjusting compensating elements in the suspension to provide greater chassis stability. Accuracy in ride height measurement enables a more precise system response and thereby enhances vehicle performance characteristics including ride comfort and handling especially during cornering, acceleration, and braking.

Typical height sensors use mechanical linkages connected between monitoring points in the suspension that convert linear displacement to a rotary motion. A contacting or non-contacting, electro-mechanical sensor converts this angular displacement to an electrical signal indicative of the height differential. However such systems often include mounting arms, sensor links and brackets, and a myriad of associated connecting fasteners and therefore increase part count and complicate assembly and servicing. Further, the exposure of these systems to the undercarriage of a vehicle increases their vulnerability to contamination and road debris that can cause damage or long term performance degradation.

Accordingly, there is a need to provide a vehicular actuator system for determining the relative height differential of an actuator such as a damper assembly or a linear actuator that is protected from road contamination and debris. Further, it is desirable if such a system is simpler to assemble, more convenient to service, and has a reduced part count. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, an actuator system for determining a relative height differential between a housing of an actuator assembly and a body of the actuator assembly for a vehicle is provided. The vehicle has a suspension wherein the housing is coupled to a first portion of the suspension, and the body is coupled to a second portion of the suspension. The system comprises a sensor coupled to the inside of the housing, and a target coupled to the outside of the body, the sensor and the target cooperating to form a magnetic field that varies in a manner indicative of the distance therebetween.

DESCRIPTION OF THE DRAWINGS

A more complete understanding of the present invention may be derived by referring to the detailed description and claims when considered in conjunction with the following figures, wherein like reference numbers refer to similar elements throughout the figures.

DESCRIPTION OF AN EXEMPLARY EMBODIMENT

Figure 1:
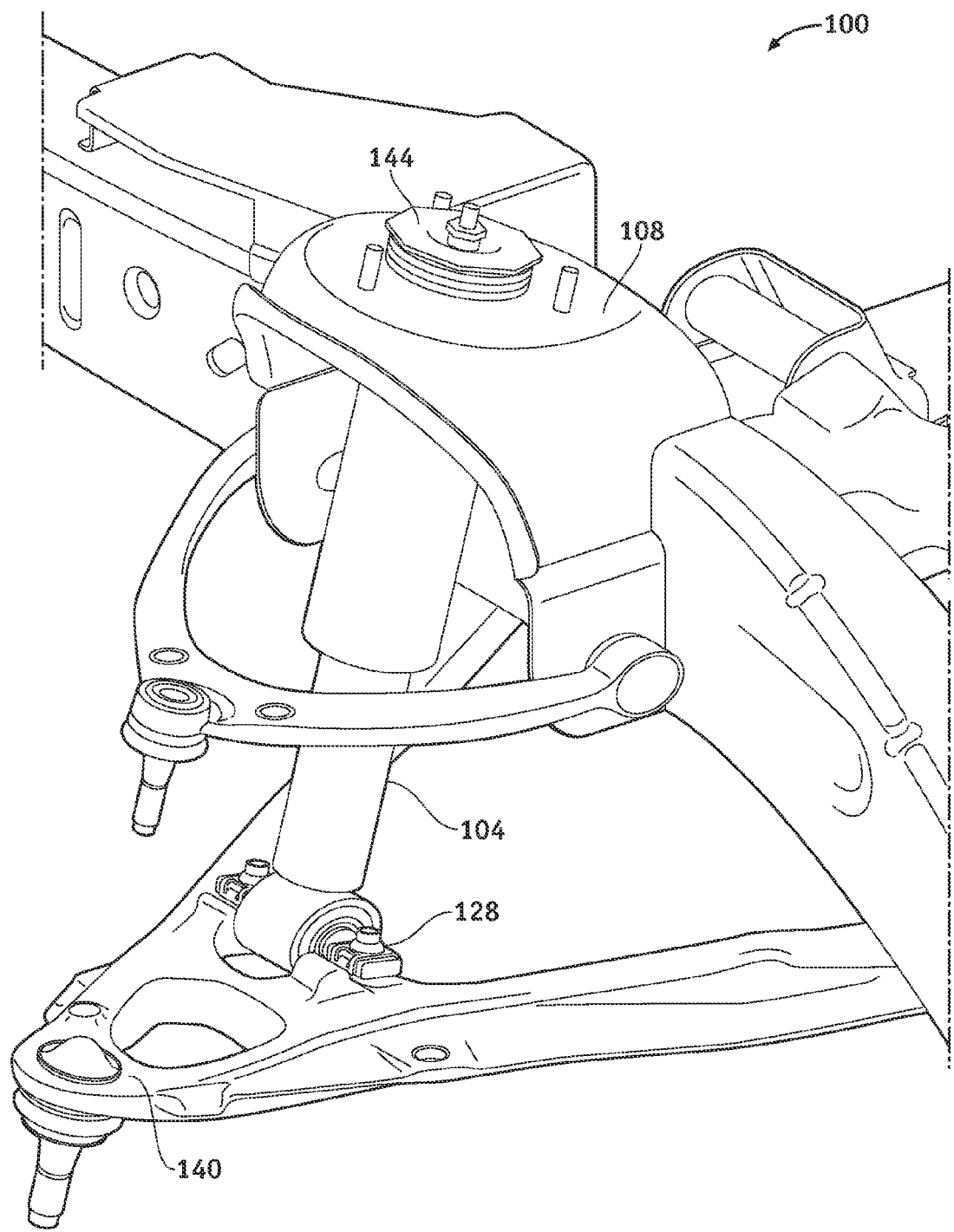
FIG. 1 is an isometric view of a vehicular suspension system in accordance with an exemplary embodiment of the present invention.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to semiconductor processing, transistor theory, packaging, and power modules are not described in detail herein.

The following description refers to elements or nodes or features being "connected" or "coupled" together. As used herein, unless expressly stated otherwise, "connected" means that one element/node/feature is directly joined to (or directly communicates with) another element, node or other feature in a mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

The present invention provides an electronic relative height differential or relative displacement sensing system for a vehicular suspension actuator that is protected from the performance degrading effects of road debris and contamination. This system also eliminates the need for many of the brackets, mechanical links, and associated fasteners prevalent in many current systems simplifying factory assembly and making servicing more convenient. Inductive height sensing technology is integrated into the inside of an active vehicular actuator such as a linear actuator or an electronically controlled damper assembly, or into a passive actuator such as a damper assembly which, as described herein, may be a shock absorber, a strut, or the like. Such an integration provides convenient servicing accessibility that can often negate the need to remove and/or replace an entire actuator assembly in the event of a malfunctioning sensing element. For example, sensing components may be accessed by removal of an outer housing such as a dust tube or the like that, when in place, provides sensors with protection from road debris and contamination. The sensing system provides information such as the relative height differential of a linear actuator or the relative height or displacement between sprung and unsprung vehicle masses that may be used by a suspension controller in making chassis stabilizing adjustments to controlled suspension members.

FIG. 1 illustrates a suspension system 100 having a height sensing system integrated into a damper assembly 104 in accordance with an exemplary embodiment. Damper assembly 104, which may comprise a shock absorber, a strut, or the like, has a lower mount 128 connected to a lower control arm 140 (unsprung vehicle mass), and an upper mount 144 connected to a frame structural member 108 (sprung vehicle mass). Mounting of damper assembly 104 to structural members may be suitably done in any conventional manner using mounting brackets and fasteners. Upper and/or lower mounts 144 and 128 may include a bushing to facilitate limited lateral motion between sprung and unsprung vehicle masses. During operation, damper assembly 104 provides a damped response to vertical motion between sprung and unsprung vehicle masses that limits and stabilizes such motions in a well known manner. Further, because damper assembly 104 is substantially rigidly connected between vehicle masses, changes in relative height are transferred to its internal components. These components include a height sensor that monitors relative height differential in a manner to be further described below.

Figure 2:
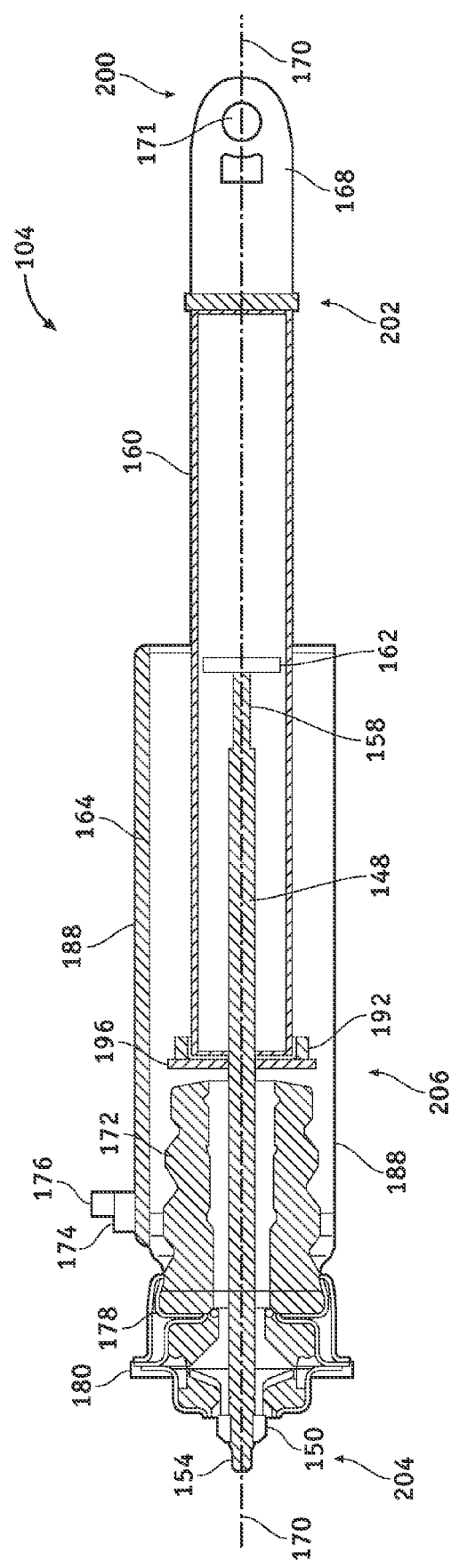
FIG. 2 is a cross-sectional view of a damper assembly for use on the vehicle suspension system shown in FIG. 1 in accordance with a further embodiment of the present invention.

FIG. 2 is a cross-sectional view of damper assembly 104 in accordance with a first exemplary embodiment. Damper assembly 104 includes a cylindrical body or damper tube 160, a cylindrical exterior housing or dust tube 188, a piston rod 148, an end member 196, an upper mount assembly 180, and a lower mounting bracket 168. Damper assembly 104 is connected in a conventional manner to lower control arm 140 (FIG. 1) at a first end 200 via mounting bracket 168 having an opening 171 configured to be used in conjunction with a suitable fastener. Damper assembly 104 is conventionally connected at a second end 204 to frame structural member 108 by a self-locking flange nut 150 that fastens to a threaded end 154 of piston rod 148. Damper tube 160 is coupled to mounting bracket 168 (and thus to the unsprung vehicle mass) at a lower end 202, and is coupled to end member 196 at an upper end 206. Piston rod 148 is slidably coupled to and substantially concentric with damper tube 160 and end member 196, and has a piston 162 mounted at a terminal end 158 thereof. An optional jounce bumper 172 comprised of a hard rubber or any suitable elastomeric material, is coupled to a jounce bumper bracket 178 and disposed concentrically about piston rod 148. When jounce bumper 172 is present, end member 196 is a jounce bumper stopper. However, in the case wherein jounce bumper 172 is not present, end member 196 may be a suitable upper end cap. Dust tube 188 is coupled to upper mount assembly 180 (and thus to the sprung vehicle mass), and is substantially concentric with and slidably coupled to damper tube 160.

Damper assembly 104 further includes a sensor board 164 and a target 192. Sensor board 164 may assume the form of any device suitable for sensing the relative position of target 192 and generating an output signal indicative of that position. In the exemplary embodiment illustrated in FIG. 2, sensor board 164 assumes the form of a pad-type flexible circuit board that is fixedly mounted to, and preferably conforms with, the inner annular surface of dust tube 188. Although not shown in FIG. 2 for clarity, sensor board 164 is populated with various electronic components, including, for example, an application specific integrated circuit (ASIC) that may be adapted to drive the other components (e.g., magnetic coils) of sensor board 164. A target 192 is comprised of a suitable magnetic pattern disposed on another flexible circuit board, and is magnetically coupled to sensor board 164. Target 192 may comprise a puck-shaped body mounted to damper tube 160 proximate to upper end 206. However, it will be appreciated that target 192 may assume other geometries and dispositions within damper assembly 104 in alternative embodiments. The length of sensor board 164 (as measured along a central axis 170) is sufficient to provide continuous coupling to target 192, and thus depends on the range of vertical travel of damper tube 160. The width or angular coverage of sensor board 164 is also sufficient to maintain coupling to target 192 and compensate for any torsional displacements between damper tube 160 and dust tube 188. A connector 176 is mounted either within a sealed opening in dust tube 188, or at the end of a wiring harness threaded through such an opening, and provides a means of electrical coupling between sensor board 164 and external electronics assemblies. These assemblies, that in one embodiment include a processor 174, are configured to receive signals from sensor board 164 and determine the position of target 192 relative to sensor board 164.

In another embodiment, processor 174 may be disposed within dust tube 188 and may be included as a component of sensor board 164. Processor 174 may be further expanded to include a local controller coupled to, and configured to provide control for, an electronically controlled damper assembly. In this case, connector 176 may provide power for sensor board 164 and provides a communication channel whereby relative height data generated by processor 174 may be transferred to a vehicle suspension controller.

During operation, changes in vertical distance between the sprung/unsprung vehicle masses are transferred to damper tube 160 coupled to the unsprung vehicle mass, and to dust tube 188 coupled to the sprung vehicle mass. As damper tube 160 moves vertically with respect to dust tube 188, target 192 moves with respect to sensor board 164 in a non-contacting manner. In one embodiment, sensor board 164 includes a series of miniature coils for generating and receiving magnetic fields that target 192 interacts with. This interaction changes the phase of these fields in a manner dependant upon the relative position of target 192 with sensor board 164. Sensor board 164 generates phase change signals based upon this interaction that are transferred through connector 176 to a supporting external electronics assembly that may include, for example, processor 174. The electronics assembly then uses these phase change signals to locate the position, and thus relative height of target 192 to sensor board 164. Such sensors are commercially available under the product designation Autopad™ through TT Electronics OPTEK Technology located in Carrollton Tex. Relative height data may be further used by a suspension controller (not shown) coupled to the electronics assembly and configured to adjust controlled suspension elements accordingly. Those of skill in the art will appreciate that other types of inductive sensing systems may be used to determine relative displacements between internal components of a damper assembly and thereby, the relative height of sprung and unsprung vehicle masses. These include but are not limited to systems based upon Hall Effect magnetic coupling provided that coupling of sensor/target components is divided between sprung and unsprung vehicle masses.

Figure 3:
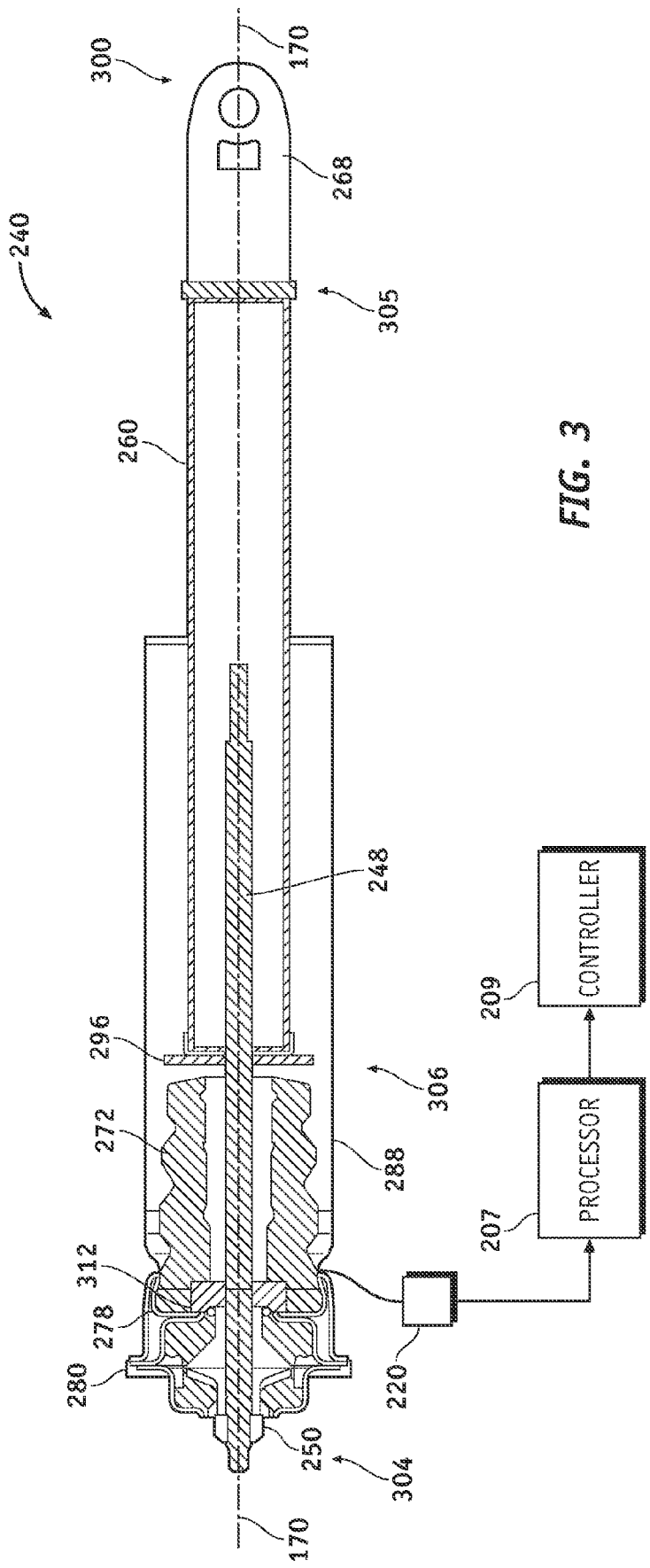
FIG. 3 is a cross-sectional view of a damper assembly for use on the vehicle suspension system shown in FIG. 1 in accordance with another embodiment of the present invention.

FIG. 3 is a cross-sectional view of a damper assembly 240 having a height sensing system in accordance with a further embodiment. Damper assembly 240 is configured with many of the same internal elements as damper assembly 104 (of FIG. 2) including a cylindrical body or damper tube 260, a housing or a dust tube 288, a piston rod 248, an optional jounce bumper bracket 278, an optional jounce bumper 272, an end member 296 (that takes the form of a jounce bumper stopper when jounce bumper 272 is present), an upper mount assembly 280, and a lower mounting bracket 268. Damper assembly 240 is mounted between sprung and unsprung vehicle masses in a manner similar to damper assembly 104 (FIG. 2) using a self-locking flange nut 250 at a second end 304 to connect to the sprung mass, and mounting bracket 268 at a first end 300 to connect to the unsprung mass. Damper tube 260 is attached to mounting bracket 268 at a lower end 305, and to end member 296 at an upper end 306. When damper tube 260 is highly compressed, end member 296 butts against jounce bumper 272 coupled to jounce bumper bracket 278 providing a cushioned limit of travel. A sensor element 312 is mounted to jounce bumper bracket 278 and is configured with an annular or semi-annular shape that surrounds or partially surrounds piston rod 248. A portion of jounce bumper 272 may be removed to accommodate sensor element 312 and prevent it from damage when jounce bumper 272 is compressed.

In one embodiment, end member 296 may comprise a ferromagnetic metal such as iron or carbon steel that acts as a target inductively or electromagnetically coupled to sensor element 312. Sensor element 312 comprises a permanent magnet for generating a magnetic field, and has sensing coils configured to detect changes in the magnetic field. A suitable permanent magnet comprises a material composition that remains permanently magnetized, and continuously generates a magnetic field such as, for example, neodymium iron cobalt (NdFeCo), or aluminum nickel cobalt (AlNiCo). During operation, the motion of end member 296 relative to sensor 312 alters the magnetic field in a manner indicative of the relative distance between them. In another embodiment, end member 296 may comprise a permanent magnetic material for generating a magnetic field, and sensor 312 is configured to sense changes in the field as end member 296 moves relative to sensor 312. In either case, sensor 312 generates a signal indicative of the sensor-to-target distance. A suitable connector 220 couples sensor element 312 through an opening in dust tube 288, providing a means for transmitting this signal to an external electronics assembly that may include a processor 207 and/or a chassis controller 209.

Figure 4:
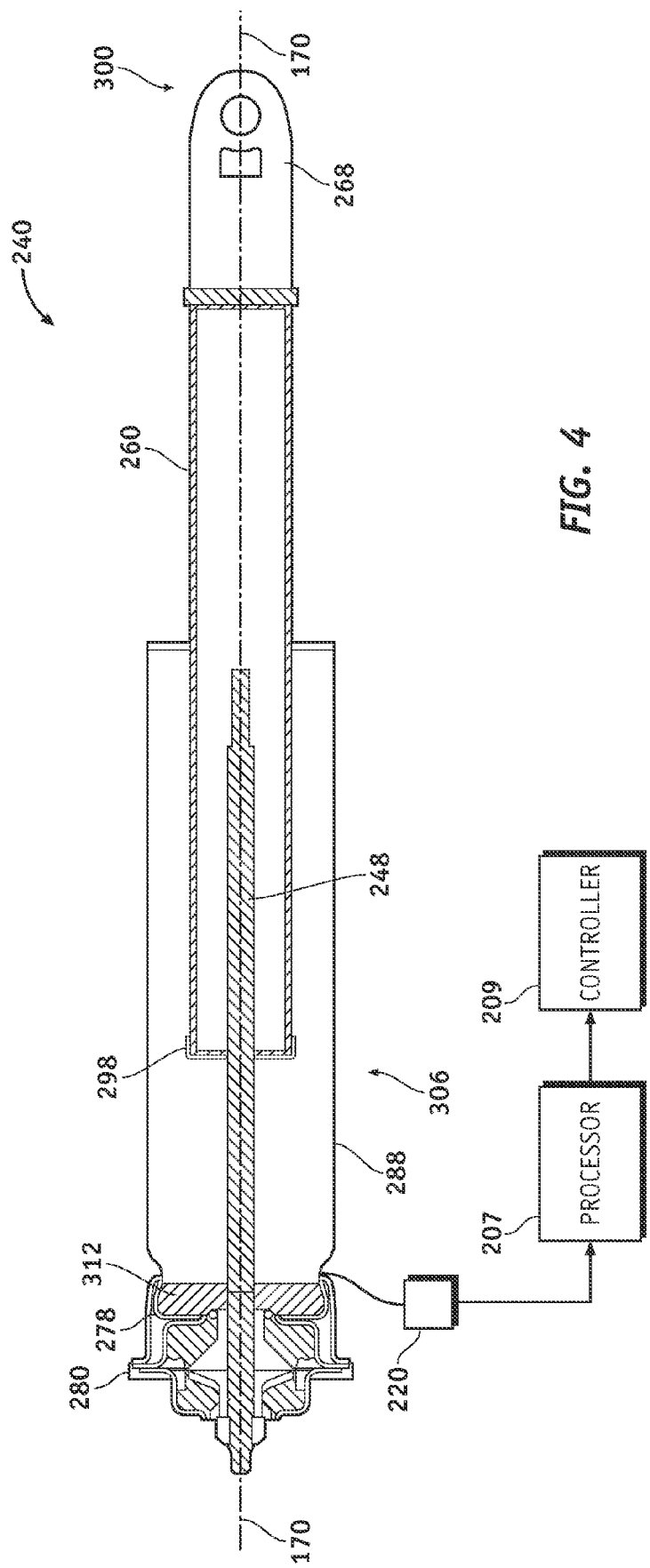
FIG. 4 is a cross-sectional view of a damper assembly for use on the vehicle suspension system shown in FIG. 1 in accordance with yet another embodiment of the present invention.

In another embodiment illustrated in FIG. 4, damper assembly 240 does not include a jounce bumper, and sensor element 312 is fixedly mounted to an inside surface of dust tube 288. In this case, end member 296 may take the form of a suitable end cap that in one embodiment has an annular shape, and is coupled to upper end 306 and slidably coupled to piston rod 248. End member 296 and sensor 312 are each suitably configured for magnetic coupling with each other as previously described, and therefore may be used in conjunction with a damper tube 260 comprising a ferromagnetic or a non-ferromagnetic material. For example, if damper tube 260 is fabricated from a non-magnetic stainless steel, end member 296 is configured to provide inductive coupling to sensor element 312. In either of these embodiments, and whether or not a jounce bumper is used, both target (end member 296) and sensor element 312 are encased within dust tube 288 and/or upper mount assembly 280, each providing protection from road debris and contamination. Further, the target and/or sensor element may be conveniently accessed for service without replacing the entire damper assembly. As with a previous embodiment, digital connector 220 may be used to couple sensor element 312 to an electronics assembly and/or a controller.

During operation, the vertical distance between sprung and unsprung vehicle masses varies depending on road conditions and the speed of the vehicle, causing damper tube 260 to move concentrically along piston rod 248 into and out of dust tube 288. Accordingly, the height differential between end member 296 acting as the target, and sensor element 312 also changes. Sensor element 312 is configured to sense changes in a magnetic field generated by motion of target end member 296 relative to sensor 312, and generate an output signal indicative of the relative position between these elements. The output signal is processed by an electronics assembly that may be disposed within dust tube 288 and that may include processor 207, to determine the relative height differential. These data may further be transferred to chassis controller 209 that responds to relative height variations by adjusting suspension elements accordingly. Sensor element 312 is coupled to the external electronics and/or controller via connector 220. In another embodiment, sensor element 312 includes an integrated processor (not shown) configured to determine relative height data and transfer these data to an external controller. In this case, power for sensor element 312 and data transfer to a controller may flow through connector 220.

Figure 5:
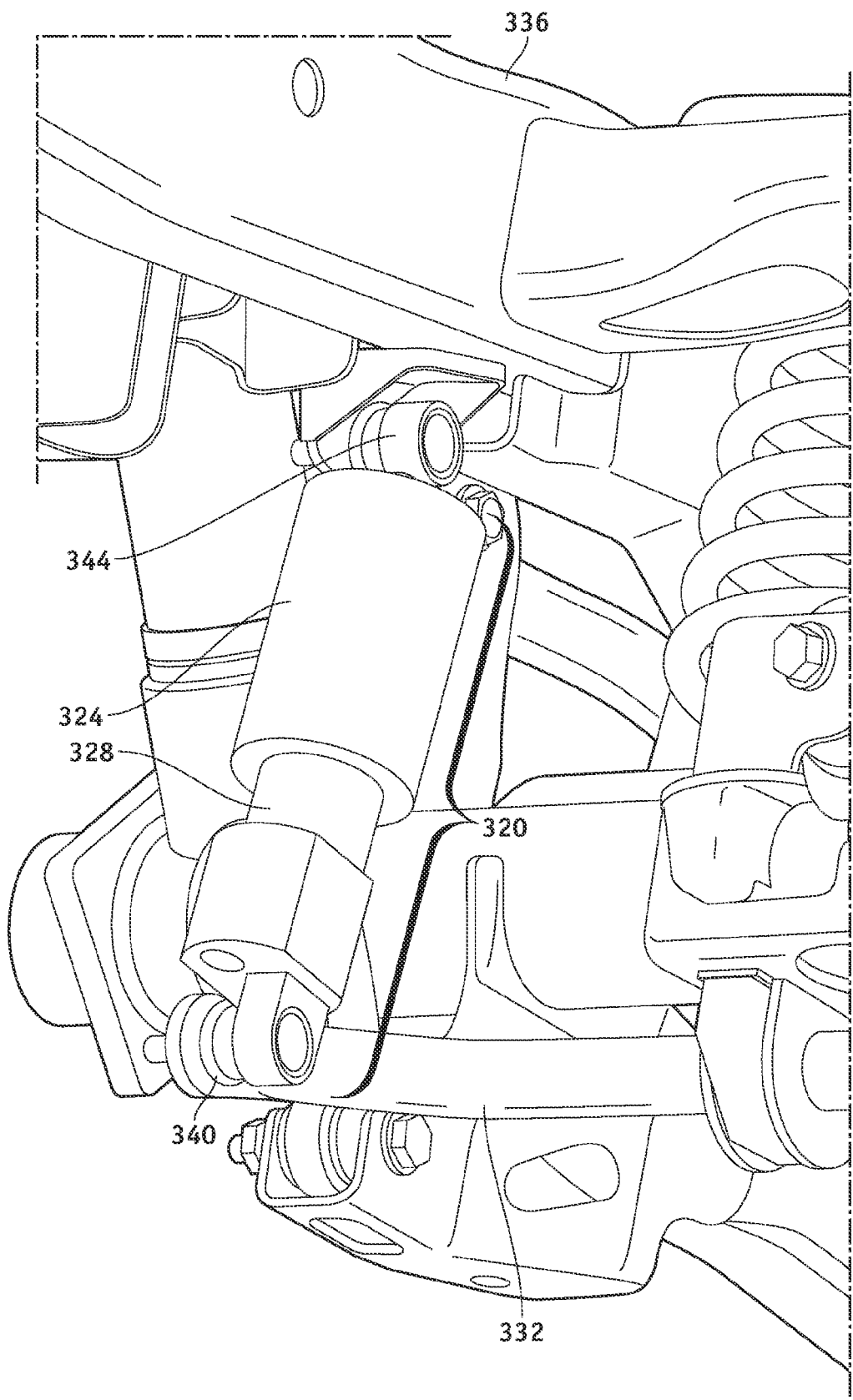
FIG. 5 is an isometric view of a vehicular suspension system in accordance with yet another exemplary embodiment of the present invention.

FIG. 5 illustrates a vehicular suspension system 350 having a linear actuator assembly 320 with an internally-mounted sensor and target for determining relative actuator displacement in accordance with another embodiment. Linear actuator assembly 320 may be coupled between any two suspension members wherein it is desirable to determine the relative height differential therebetween. As illustrated in FIG. 5, linear actuator assembly 320 comprises an outer housing or dust tube 324 coupled at an upper end 344 to an upper frame structural member 336 of the sprung mass, and a body 328 coupled at a lower end 340 to a roll stabilization bar 332. Linear actuator assembly 320 includes a sensor element coupled to the inside of dust tube 324 and a target coupled to body 328 that is magnetically coupled to the sensor. The various target/sensor element and supporting electronics configurations pertinent to this embodiment have been described in detail in previous embodiments and therefore will only be briefly discussed. In one embodiment, the sensor element generates magnetic signals that are inductively coupled to the target in a manner indicative of the relative displacement of the target to the sensor element. In another embodiment, the sensor detects a magnetic field generated by the target that changes in a manner similarly indicative. In either case, an electronic assembly that may comprise a processor is coupled to the sensor and configured to determine the relative sensor/target displacement. The relative displacement may be further used by the same or a different processor and/or suspension controller to make appropriate responding chassis adjustments.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. An actuator system for determining a relative height differential between a housing of an actuator assembly and a body of the actuator assembly for a vehicle, the vehicle having a suspension, the housing coupled to a first portion of the suspension, and the body coupled to a second portion of the suspension, the system comprising:
   a sensor coupled to the inside of the housing; and
   a target coupled to the outside of the body, the sensor and the target cooperating to form a magnetic field that varies in a manner indicative of the distance therebetween, wherein the sensor generates a signal indicative of the position of the target with respect to the sensor, and further comprising an electronics assembly coupled to the sensor, and configured to receive the signal and determine the relative height differential therefrom.

2. A system according to claim 1, wherein the sensor generates the magnetic field, and the target and sensor interact with the magnetic field in a manner indicative of the distance between the sensor and the target.

3. A system according to claim 1, wherein the target generates the magnetic field, and the sensor and the target interact with the magnetic field in a manner indicative of the distance between the sensor and the target.

4. A system according to claim 1, wherein the suspension further comprises a sprung mass and an unsprung mass, and wherein the housing is coupled to one of the sprung mass or the unsprung mass, and the body is coupled to the other of the sprung mass or the unsprung mass.

5. A system according to claim 1, wherein the actuator assembly is a linear actuator assembly.

6. A system according to claim 1, wherein the actuator assembly is a damper assembly.

7. A system according to claim 1, wherein the housing comprises an inner surface, and the sensor is fixedly mounted to the inner surface of the housing.

8. A system according to claim 1, wherein the electronics assembly is disposed within the housing.

9. A system according to claim 1, wherein the electronics assembly comprises a processor.

10. A system according to claim 1, wherein the vehicle further comprises a suspension controller, and the housing further comprises an opening, and further comprising a connector coupled through the opening for electrically coupling the sensor to the controller.

11. A damper system for determining a relative height differential between a sprung mass of a vehicle and an unsprung mass of the vehicle, the vehicle having a damper assembly with a housing coupled to the sprung mass and a damper tube coupled to the unsprung mass, the system comprising:
   a sensor coupled to the inside of the housing; and
   a target coupled to the outside of the damper tube, the sensor and the target cooperating to form a magnetic field that varies in a manner indicative of the distance therebetween, wherein the damper assembly further comprises a jounce bumper coupled to the inside of the housing, the jounce bumper having a recess, and the sensor is disposed within the recess in the jounce bumper.

12. A system according to claim 11, wherein the sensor generates the magnetic field, and the target and sensor interact with the magnetic field in a manner indicative of the distance between the sensor and the target.

13. A system according to claim 11, wherein the target generates the magnetic field, and the sensor and the target interact with the magnetic field in a manner indicative of the distance between the sensor and the target.

14. A system according to claim 11, wherein the housing comprises an inner surface, and the sensor is fixedly mounted to the inner surface of the housing in a substantially conformal manner.

15. A system according to claim 11, wherein the sensor generates a signal indicative of the position of the target with respect to the sensor, and further comprising an electronics assembly coupled to the sensor, and configured to receive the signal and determine the relative height differential therefrom.

16. A system according to claim 15, wherein the electronics assembly is disposed within the housing.

17. A system according to claim 15, wherein the electronics assembly comprises a processor integrated with the sensor.

18. A damper system for determining a relative height differential between a sprung mass of a vehicle and an unsprung mass of the vehicle, the system including a damper assembly having a housing coupled to the sprung mass, and a damper tube coupled to the unsprung mass, the system comprising:
   a sensor coupled to the inside of the housing for generating a magnetic field;
   a target coupled to the outside of the damper tube for interacting with the magnetic field in a manner indicative of the position of the target relative to the sensor; and
   a processor coupled to the sensor for determining the relative height differential.

* * * * *